BRUCE W. PRESTON
INVENTOR.

BY John R. Faulkner
Thomas H. Oster
ATTORNEYS

May 30, 1967   B. W. PRESTON   3,322,024
OPTICAL METHOD FOR THE INSPECTION OF A TRANSPARENT OBJECT
FOR DEFECTS INCLUDING COMPARING LIGHT
ENERGY AT TWO STATIONS
Filed Sept. 11, 1961   3 Sheets-Sheet 3

BRUCE W. PRESTON
INVENTOR.

BY John R. Faulkner
Thomas H. Oster
ATTORNEYS

3,322,024
OPTICAL METHOD FOR THE INSPECTION OF A TRANSPARENT OBJECT FOR DEFECTS INCLUDING COMPARING LIGHT ENERGY AT TWO STATIONS
Bruce W. Preston, Dearborn, Mich., assignor to Ford Motor Company, Dearborn, Mich., a corporation of Delaware
Filed Sept. 11, 1961, Ser. No. 137,316
1 Claim. (Cl. 88—14)

This invention pertains to a method of inspection generally, and more particularly to an improved method of detecting defects in or on specular or transparent objects having at least one substantially smooth surface.

Minor defects on or in specular and transparent objects have been rather difficult to detect and evaluate since the current methods of inspection for such defects are usually performed visually. Current inspection methods do not lend themselves readily to mass production application due to the relatively slow rate of visual inspection. Also, the evaluation of visually inspected objects has been very unsatisfactory since the acceptance of inspected objects are based on a comparison with a mentally established standard which will vary from inspector to inspector.

Specific inspection devices have been developed for determining the optical quality of glass having certain defects such as wave and wedge as disclosed in a copending application Ser. No. 70,719, filed on Nov. 21, 1960, and assigned to the same assignee as this application and now abandoned, and U.S. Patent 2,735,331, respectively.

The method of this invention may be readily applied for detecting any type of surface or body defects in transparent objects such as sheet glass as well as specular objects such as painted surfaces or first and second surface mirrors.

Only minor modifications to the apparatus utilized in the method of this invention are required to detect and evaluate most defects encountered in or on specular and transparent objects.

The method of this invention comprises the steps of establishing a source of radiant energy which is adapted to irradiate the smooth surface of either a transparent or specular object. The radiant energy waves are received by at least two radiant energy sensitive devices after the radiant energy waves have impinged the object being inspected. The effect of such radiant energy waves upon the radiant energy devices is measured to evaluate the quality of the object being inspected.

As an example, one embodiment of the method of this invention can be applied to measure defects on the surfaces of sheet glass known as "wave" which causes the distortion of objects viewed through such sheets of glass. This results in confused vision especially when the objects and the viewer are in relative motion. Wave defects are undulations which occur usually repetitiously on the surface of a sheet of glass or any other type of transparent object having parallel faces.

A radiant energy source or, for instance, a light source projecting a collimated beam may be passed through the sheet of glass containing wave defects on its surfaces. The collimated beams are refracted according to the known physical laws of optical refraction. The combined effects of the multitude of beams refracted by the wave defects on the surface of the glass results in a nonuniform illumination of a screen placed behind the transparent object being inspected—the screen being positioned so it is normal to the beam of light. This illumination generally appears as alternate light and dark bands. The greater the difference in the brightness of the two adjacent bands indicates the greater the optical refraction caused by the defects on the surface of the specimen tested and, therefore, represents a low optical quality of the specimen.

The placing of light sensitive devices behind the object being inspected will result in the picking up of the variations in light intensity caused by the refraction of the collimated beams of light due to the defects on the surface of the specimen. The use of electrical circuitry in conjunction with the light sensitive devices measures the difference or ratio of intensity of light energy incident to the light sensitive devices. This measurement can then be readily correlated with a psychological scale to evaluate the optical quality of the sheet of glass being tested.

A further application of the method of this invention can be made to detect the presence and refractive magnitude of ream in either plate or sheet glass. Ream has been defined as "a band usually of notable length but very narrow within the glass material which has an effective refractive index which differs from that of the surrounding material." By selecting an applicable radiant energy source and at least a pair of radiant energy detecting devices, positioning them at predetermined distances in respect to each other and the object being inspected, and possibly modifying the electrical circuitry, the broad method of this invention can be readily applied to detect ream as well as such other defects commonly encountered in glassmaking such as seeds, blisters, stones, string, ripple, etc.

The method of this invention can also be utilized for detecting defects which appear on the smooth surface of a specular object as, for example, a surface coated with a glossy paint.

For example, one embodiment of the method of this invention permits the evaluation of an enamel painted surface for defects generally referred to as "orange peel." Orange peel is an undesirable pattern on a painted surface which is similar to the mosaic pattern on the surface of an orange.

Current methods for inspecting surface defects such as orange peel are usually performed visually by an inspector viewing the object under a fluorescent light. Special inspection instruments such as profile meters have proven to be unsatisfactory for evaluating this type of defect on a repetitious basis due to their high expense and unreliability.

In the embodiment of the method of this invention applied to detect and evaluate "orange peel" defects, the radiant energy source is established so that the radiant energy waves irradiate the smooth surface of the specular object being inspected. The radiant energy waves are received by at last two radiant energy sensitive devices placed on the same side of the object as is the radiant energy source.

If surface defects such as orange peel are encountered by the radiant energy waves striking the object, a dispersion of the radiant energy waves will result. This dispersion is effected due to the encountering of the radiant energy waves with irregular planes at their point of intersection on the surface of the object being inspected. The defects will cause the radiant energy waves to be reflected in different directions, thereby displacing the radiant energy waves from their normal reflected direction. This displacement or dispersion results in a pattern which can be correlated with patterns already established for known defects. This permits the acceptance of the object being tested if the received pattern is equal or better than the established standard pattern for the defect being evaluated. The established standard pattern may be based on studies in which the amount of orange peel or other defects have been psychologically correlated with a degree of "annoyance" of an average consumer viewing the defective surface.

The method of this invention may also be applied to measure such specular surfaces found on plastic, ceramic, porcelain, chrom plated items, stainless steel, or vacuum deposited films.

A principal object of this invention is to provide a method for inspecting for defects on transparent or specular objects having at least one substantially smooth surface.

Another object of this invention is to provide an optical inspection method which will indicate the degree of severity of the defects on a continuous, repetitious basis.

Other objects and advantages of this invention will become more apparent when taken in conjunction with the drawings in which.

Figure 1:
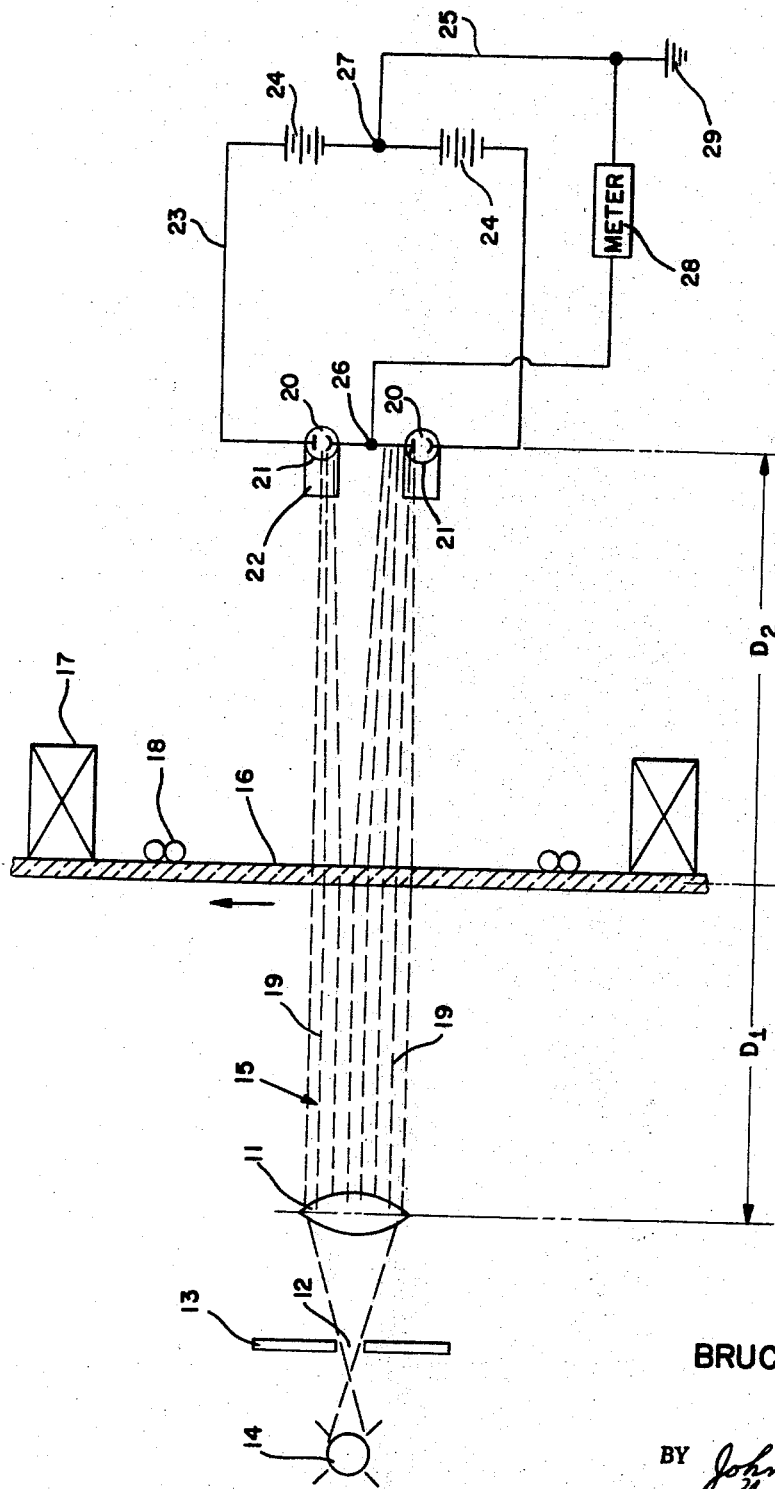
FIGURE 1 is a diagram of the optical system of an arrangement of elements used in conjunction with one embodiment of the method of this invention for measuring defects known as waves on the surface of a transparent object.

In FIGURE 1 can be seen lens 11 and an aperture 12 in a baffle 13 which are placed in approximate alignment with a light source 14 and in the focal plane of lens 11 in order to project a beam of light 15 through a transparent object 16 having substantially parallel faces. The transparent object 16 which is to be inspected may be carried on a support 17 or upon a conveying means 18 along a definite path as indicated by the arrow at a predetermined distance $D_1$ from lens 11.

An alternate arrangement may provide for maintaining the object 16 stationary and moving the inspection apparatus. In this instance, the light source 14 projects a collimated beam 15 consisting of substantially parallel rays 19 passing through a transparent object 16 such as a sheet of glass. Other types of radiant energy sources may be used which give forth visible or invisible waves which are encountered by the transparent object 16.

In this embodiment, two light sensitive devices 20 are positioned so that their light sensitive surfaces 21 lie in a plane generally perpendicular to the rays 19 of the beam of light 15. The light sensitive surfaces 21 are placed at a distance $D_2$ from the transparent object 16 on the side opposite of the light source 14. These light sensitive surfaces 21 may be protected by a shield 22 to assure a greater accuracy in the measurement of the light intensities by reducing the pickup of stray light.

In FIGURE 1 it can be seen that a pair of light sensitive devices 20, such as phototubes, are placed in series in an electrical circuit 23 with a pair of batteries 24. The polarity of each phototube is opposed to each other in the circuit 23 to permit the measurement of the difference in intensity incident to each light sensitive surface 21. A second circuit 25 is connected in parallel with the first circuit 23 at junction point 26 located between the light sensitive devices 20 and junction point 27 located between the batteries 24. A meter 28 is placed in the second circuit 25 which is connected to ground at 29.

In the application of the method of this invention for measuring defects known as wave on the surface of a sheet of glass, the pair of light sensitive devices 20 such as phototubes are placed so that their light sensitive surfaces 21 are positioned in a plane generally perpendicular to the nonrefracted rays 19 of the beam of light 15 at an approximate distance $(D_1+D_2)$ of 25 feet from the lens 11. The light sensitive surfaces 21 of each phototube are ⅛ inch in diameter.

The sheet of glass in conveyed in a plane parallel with the light sensitive surfaces 21 and approximately 6 feet distance ($D_2$) from the phototubes.

The electrical circuits 23 and 25 employed in this embodiment illustrated in FIGURE 1 will permit the measurement of the difference in intensity of the light energy incident to the phototubes. At the given distance $$(D_1+D_2),$$

any departure of the surfaces of the sheet of glass being inspected from an effectively uniform parallel condition will result in the refraction of each local ray 19 of light at different angles. The combined effects of the multitude of these rays 19 refracted by the wave defects on the surface of the sheet of glass results in a nonuniform illumination or alternate light and dark bands in the plane of light sensitive devices 20. The sheet glass is conveyed in the direction of the arrows so that the phototubes will scan a band of the sheet of glass along an axis which is customarily substantially perpendicular to the axis of orientation of the wave defects found on the surface of the sheet glass. The distance between the centers of the phototubes in this instance is ⅝ inch, this distance being based upon the typical characteristics found to exist between the maximum and minimum of intensity for wave defects of the specimen being inspected.

It has been observed, based on studies undertaken, that the average optical quality of a specimen may be represented with a reasonably high reliability by scanning a single narrow band across the surface of the sheet of glass being inspected.

Figure 2:
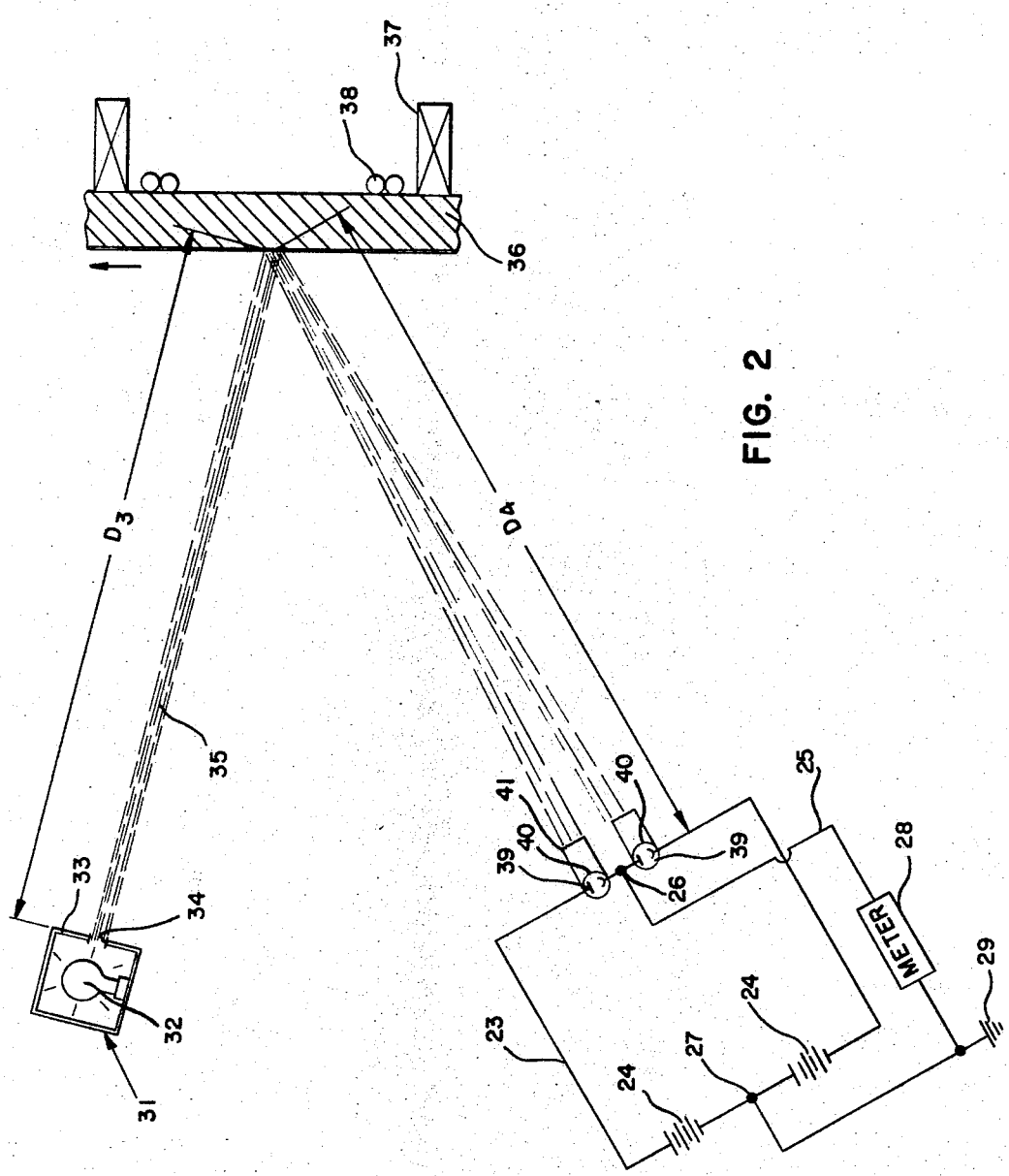
FIGURE 2 is a diagram of the optical system of an arrangement of elements used in conjunction with a further embodiment of the method of this invention for measuring defects on the first surface of specular objects.

In FIGURE 2 is seen a modification of the method of this invention employing a further embodiment to measure defects such as orange peel on a smooth, reflecting surface of an object. In FIGURE 2 is seen a point source lamp 31 which comprises a light source 32 enclosed by a housing 33 having an aperture 34 therein through which the light is projected as a narrow beam of light 35.

A specular object 36, a glossy painted flat sheet of metal in this instance, is carried on a support 37 or a conveying means 38 along a definite path as indicated by the arrow. The point source 31 is placed at a predetermined distance ($D_3$) from the surface of the specular object 36. The beam of light 35 projected by the source lamp 31 is controlled so that the beam of light 35 strikes the smooth surface of the specular object 36. A plurality of light sensitive devices 39, such as phototubes, are placed in a plane which is normal to the beam of light reflected from the surface of the specular object 36 if no defects are encountered. The light sensitive devices 39 are positioned at distance ($D_4$) from the surface to be inspected. The light sensitive devices 39 have light sensitive surfaces 40 which may be protected by shields 41.

The circuitry shown in FIGURE 2 is similar to the circuits 23 and 25 shown in FIGURE 1, thereby permitting the difference in intensity received by the light sensitive surfaces 40 to be read on the meter 28.

In this application of the method of this invention, a point source lamp is utilized since a relatively small repetitious pattern, such as an orange peel defect, is rather difficult to detect by a broad beam. The beam of light 35 projected by the point source lamp 31 makes an acute angle with the smooth surface of the specular object 36 being tested. The rays of the beam of light 35 are reflected according to the well-known physical law that the angle of reflection is equal to the angle of incidence. As long as the smooth test surface is continuous and regular, the reflected rays of light will be of uniform intensity and present a uniform pattern. If the light is reflected from a defective surface, the reflected rays of light are displaced from their normal position as seen in FIGURE 2.

The displaced rays of light may either be coincident with another ray of light either undisplaced or displaced so that the light intensity on the plane of a screen, for example, located in accordance with the method of this invention, is increased due to the combined intensity of the coincident rays of light; or the displaced ray of light may be transposed to another position from its normal position; or possibly the displaced ray of light may be reflected at such an angle as to cause it to become lost due to the reflected ray of light being at such an angle that it may not strike the viewing screen. If the reflected ray still strikes the screen, then its effect on the intensity of light at the point of impingement is negligible due to the extreme angle of incidence.

The combined effects in the intensity of the resultant light pattern in the plane of a screen can be evaluated to measure the defects on the surface of the specular object 36. A pattern of uniform intensity would indicate a perfect surface, while an abnormal light pattern would indicate a departure from a perfect surface with the resultant pattern of light distribution indicating the relative degree of optical disturbances created by the defects.

In the application of the method of this invention seen in FIGURE 2, to detect and evaluate orange peel defects on painted surfaces, the narrow beam of light 36 is projected by the point source lamp 31 to make an approximate angle of 20° with a plane normal to the surface of the specular object 36 being inspected. The aperture 34 is approximately 10 inches ($D_3$) from the surface being inspected. The point source lamp 31 is a 100-watt arc light giving forth a 40 candle per square millimeter light, the mean light source diameter being 1.6 inch millimeter. The light sensitive devices 39, or phototubes in this instance, are placed in a plane which is normal to reflected rays of light from the surface when no defects are present on the surface. The phototubes are placed 10 inches ($D_4$) from the surface being inspected. The diameter of the light sensitive surfaces 40 of the phototubes are approximately $\frac{1}{32}$ inch in diameter. In this embodiment, the phototubes are separated by approximately $\frac{1}{8}$ inch to permit the detection of the small mosaic pattern of an orange peel type of defect.

Figure 3:
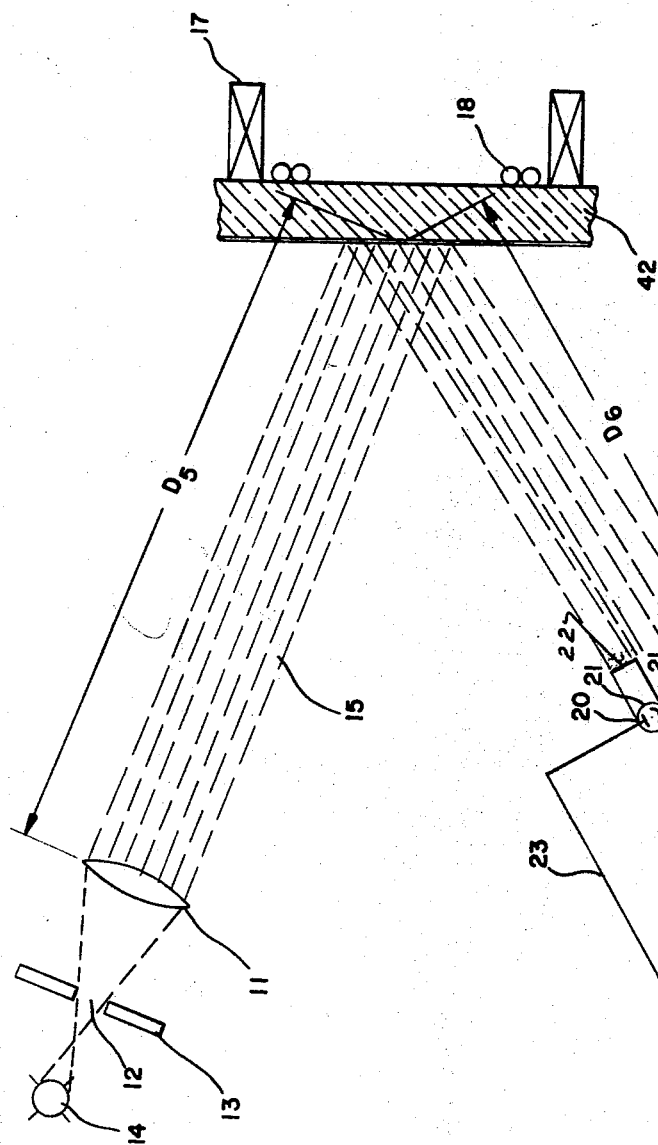
FIGURE 3 is a diagram of an optical system showing an alternate arrangement of elements used in conjunction with the second embodiment of the method of this invention for measuring defects on the first surface of specular objects.

In FIGURE 3 is a further embodiment of the method of this invention in which the defect has a larger dimensional magnitude than orange peel as, for instance, waves on the reflecting surface of a first surface mirror. In this embodiment, a collimated beam of light 15 similar to the beam of light depicted in FIGURE 1 is selected to be projected at an angle of approximately 25° with a plane normal to the surface of a first surface mirror 42 with the lens 11 at an approximate distance ($D_5$) of 19 feet from the surface being stated. The plane in which the light sensitive devices 20, phototubes in this instance, are located is approximately 6 feet ($D_6$) from the test surface lying in a plane normal to the reflected beam of light when they are not displaced. The diameter of the light sensitive surfaces 21 of the phototubes is approximately $\frac{1}{8}$ inch and the distance between them is approximately $\frac{5}{8}$ inch. The electrical circuitry in FIGURE 3 is similar to the circuitry shown in FIGURES 1 and 2 to measure the difference in intensity of the light incident to the phototubes.

It can be seen that the method of this invention can be modified to measure other types of defects found on the surfaces of plastics, ceramic, porcelain, chrome plated items, stainless steels, and even second surface mirrors. It is possible to establish the dimensions of $D_5$ and $D_6$ and select and position a radiant energy source and at least two radiant energy receiving devices to measure various characteristic patterns of defects on such surfaces. Also, it is to be understood that defects on nonspecular surfaces can be detected and evaluated by depositing a specular reflective film on a surface to be inspected prior to applying the method of this invention.

Figure 4:
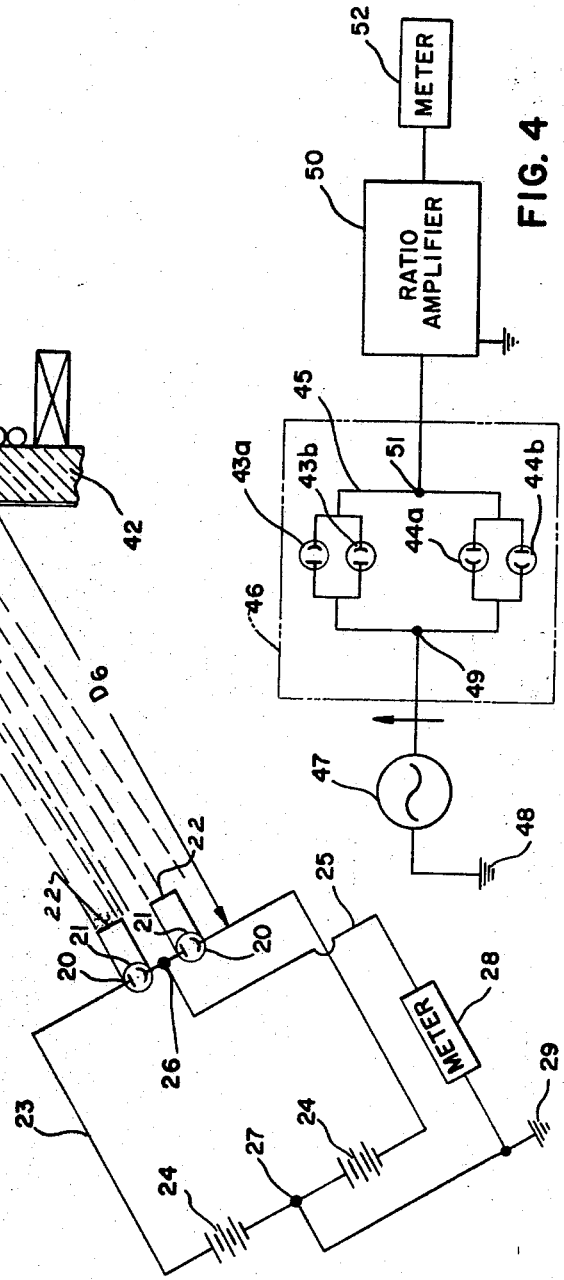
FIGURE 4 is an alternate circuit diagram which may be employed in conjunction with the optical system illustrated in FIGURE 1 through 3.

In FIGURE 4 is seen an alternate arrangement of the electrical circuitry which may be employed with the embodiments shown in FIGURES 1, 2 and 3. This alternate arrangement may comprise two phototubes or, in this instance, comprises two pair of phototubes 43a and 43b and 44a and 44b connected in parallel with each other in an electrical circuit 45 mounted in a housing 46. Phototubes 43a and 43b are of opposite polarity of the phototubes 44a and 44b. An A.C. generator 47 which is grounded at 48 is connected to the electrical circuit 45 at junction point 49. A ratio amplifier 50 known in the art and described in Phototubes, page 13, published by the Tube Department of the Radio Corporation of America in 1940, form PT-20R1 is connected to the circuit 45 at junction point 51 to provide an electrical signal. This signal is readily displayed on a meter 52 and may be picked up upon a recording instrument or other indicating device if desired.

The circuits shown in FIGURES 1 through 3 and FIGURE 4 can be readily adapted to rapid inspection of specular or transparent objects on a regular inspection conveyor. This can be achieved by the use of electronic tubes, relays, or other techniques known in the art which are capable of indicating preset levels of the signals for the basic circuitry selected. Further, it is possible to control automatically indicating accessory devices such as signal lights, bells, counters, marking devices, or others which may be desired or seem convenient for the needs of the inspection system employed.

I claim:

A method of inspecting a transparent object having substantially parallel faces to detect defects in the object, which method comprises the steps of:
projecting a single, collimated beam of light against a prescribed area of a face of the object in such a direction that parallel rays of said beam of light intercept the face of the object perpendicularly;
moving the object with respect to said beam of light so that substantially all of the face of the object is scanned by said beam of light;
detecting by means of light sensitive devices at two stations spaced in the direction of motion of said object two separate and distinct portions of the light transmitted through separate portion of the object as a result of said single beam of light being projected against the face of the object;
continuously comparing in a bridge circuit the output of said light sensitive devices at said stations, thus comparing any variation of light intensity between said stations, and determining from a meter connected to the bridge circuit the difference in light intensity at said stations to indicate the presence or absence of a defect.

References Cited
UNITED STATES PATENTS

| | | | |
|---|---|---|---|
| 1,917,379 | 7/1933 | Lowry | 88—14 |
| 2,415,174 | 2/1947 | Hurley | 88—14 X |
| 2,429,331 | 10/1947 | Sachtleben | 250—219 |
| 2,816,479 | 12/1957 | Sloan | 88—14 |
| 2,889,737 | 6/1959 | Griss et al. | 88—14 |
| 3,030,516 | 4/1964 | Seavey | 88—14 |

JEWELL H. PEDERSEN, *Primary Examiner.*

EMIL G. ANDERSON, *Examiner.*

T. L. HUDSON, O. B. CHEW, *Assistant Examiners.*